Figure 5:
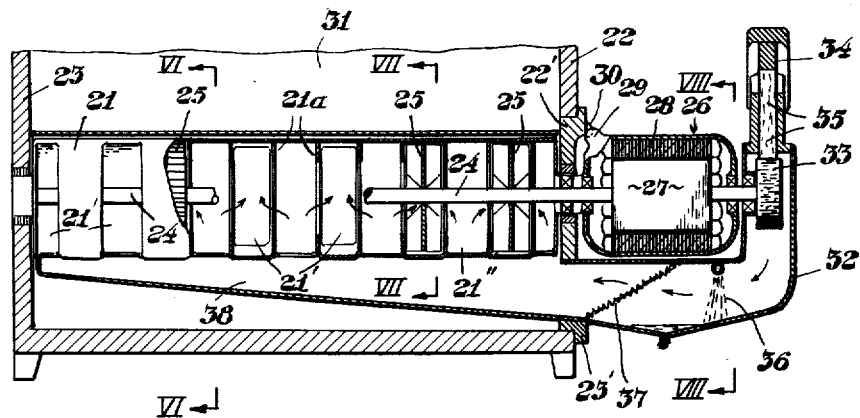

Nov. 27, 1962
G. R. OLIN
3,065,553
APPARATUS FOR TREATING FOOD
Filed Sept. 29, 1960
2 Sheets-Sheet 1
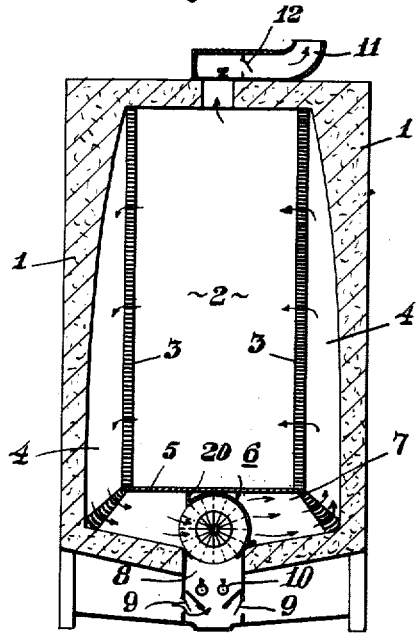
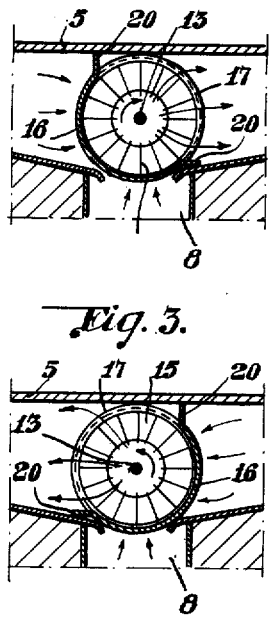
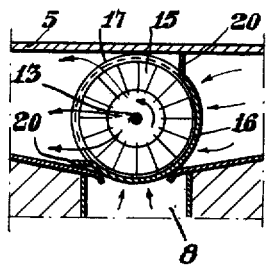
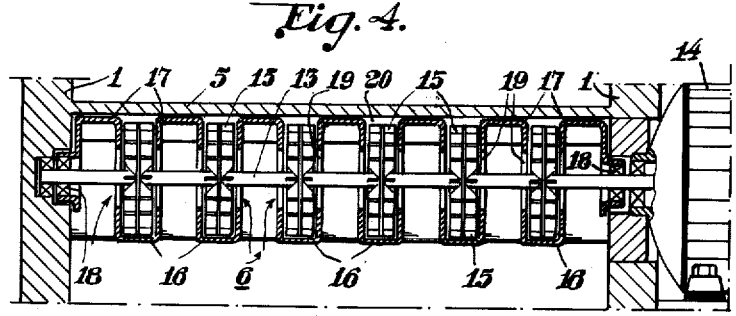

United States Patent Office 3,065,553
Patented Nov. 27, 1962

3,065,553
APPARATUS FOR TREATING FOOD
Gösta Robert Olin, Saltsjo-Duvnas, Sweden, assignor to Norrmalms Industrier Aktiebolag, Stockholm, Sweden, a Swedish joint-stock company
Filed Sept. 29, 1960, Ser. No. 59,220
Claims priority, application Sweden Oct. 3, 1959
3 Claims. (Cl. 34—191)

Within the food industry a treatment of different foods, particularly charcuteries, with heat, cold, steam, smoke or the like is frequently desirable. Such treatment may suitably be carried out by placing the food products in special cabinets, chambers or ovens through which hot or cold air, possibly mingled with steam or smoke, is circulated by means of a blower. In such manner cooking, roasting, baking and other heat treatment of the food as well as smoking with or without heat may be carried out. Also cooling or even freezing of foods is, of course, possible, if the apparatus is fitted for such purpose.

To make the treatment of the products as uniform as possible, it is necessary to change at certain intervals the direction of flow of the air through the compartment containing the food products to be treated. For such purpose the blower is commonly combined with adjustable valve means, which in simpler types of apparatuses of the kind in question are arranged to be manually operated, but which preferably are automatically actuated by means of special booster mechanisms operating in response to some suitable timer, because an improved regularity of the intervals is thereby attained and at the same time expensive labor is saved. The latter type of plants have, however, become unreasonably expensive because the designers have resorted to complicated solutions of the valve readjustment problem.

This invention has for its main object to provide a simplified and improved apparatus for treating foods which, besides a compartment for housing the food to be treated, comprises a blower having a motor and a driving shaft with a number of fan wheels mounted thereon, and valve means for reversing the flow direction of the treating medium through said compartment, in which apparatus there is no need for an additional motor or driving unit for actuating the valve means and in which the readjustment of the valve means takes place as a result of a simple reversal of the direction of rotation of the blower motor and driving shaft.

For carrying out this invention it is necessary that the fan wheel or wheels of the blower are of such a known design that the blower is capable to operate, i.e. generate an air stream, with the same efficiency in substantially one and the same direction independent of the direction of rotation of the driving shaft. This requirement is met e.g. by centrifugal fan-blowers with straight, radially disposed vanes, whereas propeller type fans are not useful because of their low efficiency, their considerable space requirement and their general manner of operation.

According to the invention there is not only used a particular type of fans but furthermore the valve means comprises a housing which partially encloses the fan wheel or wheels and which is rotatably mounted to be turned about the driving shaft of the blower unit between two predetermined positions.

As a main feature of the invention the improved apparatus has means for reversing the direction of rotation of said blower driving shaft and means for turning said valve housing from either position thereof to the other under the influence of secondary forces resulting from the change of direction of rotation of said blower driving shaft so that each reversal of said direction will automatically cause readjustment of the valve housing and hence also a change in the direction of air flow through the food containing compartment. Evidently this arrangement will readily make possible a completely automatic operation of the apparatus under the control of a suitable timer and a driving motor reversing switch mechanism responsive thereto.

According to the basic inventive idea any such secondary forces occurring during the operation of the blower unit as reactive forces, mechanical and aerodynamical friction forces as well as forces derived from aerodynamic pressure or suction may be utilized alone or in combination to perform the turning of the valve housing. Preferred embodiments of the invention will, however, be described in the following text, wherein reference is had to the accompanying drawings, which diagrammatically illustrate the main structural details necessary for a full understanding of the invention.

Figure 6:
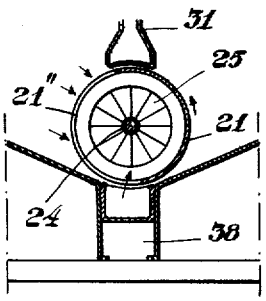
Figure 7:
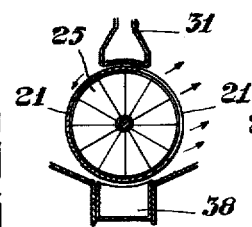
Figure 8:
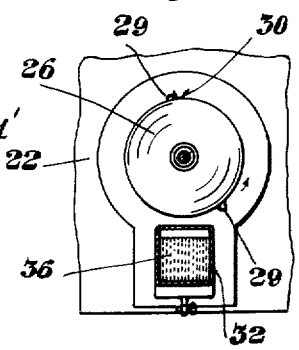

In the drawings: FIG. 1 is a sectional elevation of a cabinet forming an apparatus for treating food, FIG. 2 is a fragmentary cross section of the blower unit included in the lower part of the cabinet according to FIG. 1 and showing the valve housing in its one position, FIG. 3 is a similar cross section showing the valve housing in its other position, FIG. 4 is a longitudinal sectional elevation of the blower unit with its valve housing in its position according to FIG. 3, FIG. 5 is a longitudinal section of the lower part of a slightly modified apparatus showing a blower unit which also combines means for producing smoke, FIG. 6 is a cross section taken along the line VI—VI in FIG. 5, FIG. 7 is a cross section taken along the line VII—VII in FIG. 5, and FIG. 8 is a cross section taken along the line VIII—VIII in FIG. 5.

The apparatus shown in FIG. 1 comprises a cabinet having heat insulated walls 1 which will prevent unnecessary heat losses. The interior of the cabinet includes a central compartment 2 for the food to be treated and laterally this compartment is bordered by side walls 3 of a type capable of letting air pass through. Said walls have the purpose of directing and distributing the passing air, which through the lateral compartments 4 circulates through the central one. Under the bottom 5 of the central compartment is a blower unit 6 producing an air stream in the one or the other lateral direction. Between the side edges of the bottom 5 and the lower ends of the side walls 1 there may be provided stationary guiding vanes 7 for improving the air flow conditions from the blower unit 6 upwards through the one lateral compartment 4, through the central compartment 2 and back to the blower through the opposite lateral compartment 4.

In its lower part the cabinet has a trough-like chamber 8 extending in the full length along and beneath the blower unit 6, said chamber being provided with suitable inlets or openings 9 for air, steam, smoke or mixtures thereof. Within the chamber 8 there may be provided tubular gas burners 10 for heating the gaseous medium introduced through the blower unit 6 into the cabinet during simultaneous circulation of the main air volume already present therein. Of course these gas burners 10 may be replaced by electric heating elements or by cooling coils if the cabinet is intended to be used for cooling or freezing food. Such latter elements or coils could, however, better be placed on both sides of the blower unit 6 under the bottom 5 or be built into the walls 3 so that they will be passed by the entire air volume circulating in the cabinet.

At its top the cabinet has a suitable outlet 11 with a valve 12 to let surplus medium escape at a rate corresponding to that of the supply of fresh medium.

The blower unit 6 which is more clearly illustrated in FIGS. 2–4 comprises a horizontal driving shaft 13 extending in the full length of the cabinet and rotatably mounted therein. The one end of said driving shaft is coupled to an electric motor 14 of a type, the direction of rotation of which may readily be reversed. The driving shaft 13 carries a number of axially spaced fan wheels 15, which are all of such a design that they produce the same work irrespective of their direction of rotation. They are shown as centrifugal fan wheels with straight, radially disposed vanes arranged on both sides of a circular supporting disk which in any suitable manner is secured to the shaft 13.

The fan wheels 15 are each partially enclosed by a trough- or cup-like casing 16 the bottom of which covers approximately half the circumference of the wheel and the side walls of which extend towards the driving shaft 13 on both sides of the related fan wheel without reaching said shaft, however. The casings 16 are mutually interconnected by similar casings 17 bridging the spaces between the fan wheels to form a blower housing in which the casings 16 and 17 are staggered about the driving shaft 13. The housing thus formed has its ends rotatably mounted at 18 coaxially with the driving shaft 13, so that the housing 16, 17 can rotate about the latter. The side edges of the casings 17 are secured to the corresponding side edges of the casings 16 so that the side walls of the casings together form annular separating walls on both sides of each fan wheel 15 having central air intake openings 19, through which the fan wheels may collect air from the spaces between the fan wheels to then throw this air out through the radial openings between the casings 17. The air flow direction from the blower unit 6 can thus be changed simply by turning the housing 16, 17 as illustrated in FIGS. 2 and 3.

To accomplish this change in the air outlet direction and hence a reversal of the air flow through the central compartment 2 of the cabinet the direction of rotation of the driving shaft 13 is reversible for instance by changing the polarity or the phases in the current supply to the motor 14. Furthermore the blower housing 16, 17 is on its outside provided with longitudinally extending wings or flanges 20 which are mounted at the end edges of those casings 16 which partially cover the fan wheels 15. These wings or flanges 20 which also extend along the corresponding end edges of the casings 17, project obliquely outwards in such a manner that they form abutment surfaces for the air thrown out from the fan wheels and thus will be actuated upon in the one or the other direction dependent on the direction of rotation of the fan wheels. Consequently, if the fan wheels rotate clockwise as in FIG. 2, the housing will also be turned clockwise to a position in which the air is thrown out towards the right under the bottom 5, whereas, if the fan wheels rotate in counter clockwise direction as in FIG. 3, the housing 16, 17 will be turned in counter clockwise direction to a position letting out air towards the left.

The wings or flanges 20 also serve as stop means in cooperation with the surrounding walls, including the bottom 5, to define the respective operative positions of the housing and prevent excess leakage around the blower unit. In the embodiment described the housing 16, 17 at each reversal of the direction of rotation of the fan wheels will rotate a limited angle of approximately 90° about the driving shaft 13, but there is nothing preventing a more extended or a shortened rotation if so desired to fit the compartment in which the blower housing is mounted.

When the housing 16, 17 assumes the angular position shown in FIG. 2, air will be drawn in both from the central compartment 2 through the left hand lateral compartment 4 and from the lower chamber 8, which also appears from FIG. 1 where the section of the blower unit is taken through a space between two adjacent fan wheels. In a corresponding manner air will be drawn in from the central compartment 2 through the right hand lateral compartment 4 and also from the chamber 8, when the housing assumes the position of FIG. 3. Thus a certain amount of fresh, heated and possibly steam or smoke mingled air will continuously be supplied through the chamber 8 independent of the direction of rotation of the fan wheels while at the same time a corresponding, limited amount of air will escape through the outlet 11 of the cabinet.

Of course it is not always necessary to let the air thrown out from the fan wheels strike certain wings or flaps on the housing. In some cases, where the housing is very easily movable, it may be turned as described already by the air friction occurring between the rotating fan wheels and the housing and/or by the unavoidable bearing friction if the housing is journalled directly on the driving shaft as shown.

In FIGS. 5–8 there is shown another blower unit which is incorporated in a smoking cabinet, which has only been partially indicated since it is generally similar to the one of FIG. 1. The main difference, besides the construction of the blower unit which will be described in the following, is that the cabinet of FIGS. 5–8 has a central, vertically extending partition 31 dividing the interior of the cabinet into two side-by-side compartments which also intercommunicate above the upper edge of said partition so that the treating medium for the sausages or other food products contained in the apparatus may circulate substantially upwards through the one compartment and downwards through the other. The blower unit is also in this cabinet located beneath the food receiving space and above a chamber through which fresh treating medium may always be supplied by means of the fan wheels irrespective of the direction of rotation of the latter.

In this apparatus the blower unit comprises a cylindrical barrel 21 journalled at the front and rear walls 22 and 23 respectively of the cabinet so that it may freely rotate about its longitudinal axis. The barrel 21 has openings 21' and 21" which are in the form of broad slots extending peripherally over each one half of the circumference of the barrel. The openings are staggered along the barrel so that the openings 21' on the one side of the barrel are displaced in the longitudinal direction of the barrel in relation to the openings 21" on the opposite side of the barrel.

Inside the barrel 21 is rotatably mounted a driving shaft 24 carrying a number of fan wheels 25 (two of them being removed in FIG. 5 to show the openings 21'). These fan wheels are situated in line with each one of the openings 21' on the one side of the barrel 21 which means that the openings 21" on the other side of the barrel will register with the interspaces between the wheels. The latter openings serve as intake openings for the air, steam or smoke to be circulated by the blower unit whereas the openings 21' serve as outlet openings from the fan wheels. Annular flanges 21a are secured to the inside wall of the barrel 21 on both sides of each fan wheel 25 to prevent the air from leaving the fan wheels in axial direction. The arrangement offers the advantage that the intake and outlet of air or the like is distributed over a considerable length of the barrel.

Outside the front wall 22 of the cabinet the driving motor 26 of the blower is arranged. This electric motor has a rotor 27 which is coupled to the driving shaft 24 and a stator 28 which is rigidly connected to the barrel 21 and rotatable therewith. Externally the stator 28 has projections 29 for cooperation with an abutment 30 on a door 22' in the front wall 22 of the cabinet and in a manner not shown the current supply wires to the motor 26 are so arranged as to permit rotation of the stator 28 to and fro that approximately half revolution defined by the cooperating projections 29 and abutment 30.

Obviously the reactive torque acting on the stator 28 during rotation of the rotor 27 in a certain direction will turn the stator and hence the barrel 21 to a position in which one of the projections 29 contacts the abutment 30 and the outlet openings 21' of the barrel 21 will then be positioned to establish a certain air flow direction within the cabinet. If now the direction of rotation of the rotor 27 is reversed, this will of course cause the stator 28 to turn to its other position so that the barrel 21 will, in its turn, automatically reverse said air flow direction through the cabinet. Since the cabinet is divided into two vertical, shaft-like compartments by the central partition 31, which is located above and in line with the axis of the blower unit, the air in the cabinet will in the first case pass upwardly through the one compartment and downwardly through the other and in the second case reverse its direction of flow therethrough.

The motor 26 has a shaft extension at its outer end, said extension passing through a box-like addition 32 wherein it carries a roller 33 against the periphery of which by means of a cup-like weight 34 are pressed blocks 35 of wood. The inner end of such blocks will frictionally engage the roller 33 and cause a generation of smoke which is drawn into the cabinet through a passage under the motor where the smoke passes a curtain 36 of water and a filtering screen 37. The smoke then passes into a tapering chute 38 beneath the barrel 21. A portion of each intake opening 21" of the barrel 21 will be located above this chute in both positions of the barrel and fresh smoke will thus be continuously supplied to the air circulated by the blower unit.

Steam or other gaseous medium may of course be supplied in a similar manner, possibly in combination with smoke if so desired, or the smoke generating device may be shut off so that the food contained in the cabinet is treated with air or steam only. In a manner not shown the circulating medium may, also in this case, be heated to a suitable temperature.

With the blower unit construction described in connection with FIGS. 5–8 it is apparent that the housing or barrel 21 will turn in a counter clockwise direction if the fan wheels are caused to rotate clockwise and vice versa. Should this be less desirable from any point of view, the direction of turning of the housing may easily be changed by incorporating a simple mechanical gear between the stator 26 and the barrel 21. Such a gear may also be used to obtain a certain ratio between the movement of the stator and the movement of the barrel so that already a small rotational movement of the stator will be enough to complete the full change of position of the barrel.

Though the invention has now been described with reference to certain embodiments thereof, in which the blower unit is positioned below the compartment or compartments containing the products to be treated and with its driving shaft extending horizontally it should be understood that the blower unit may instead be located near the top of the apparatus or even outside the same and, if desired, with its driving shaft vertically positioned. The number of fan wheels on the driving shaft may also be varied within wide limits. Therefore the embodiments described and illustrated may be modified in many ways within the scope of the appended claims.

I claim:

1. In an apparatus for treating food with a gaseous medium; the combination of means defining a compartment for containing the food to be treated; and blower means for circulating a gaseous treating medium through said compartment and comprising a reversible electric motor rotatable in first and second directions, a driving shaft coupled to said motor for rotation by the latter, a plurality of radial impellers mounted on said shaft, a blower housing turnable about an axis parallel to said shaft and defining inlets and outlets for the gaseous treating medium to and from said impellers and communicating with said compartment at substantially diametrically opposed sides of said housing, means limiting the turning of said housing in opposite directions at a first position where said outlets are disposed at one side of said housing and the gaseous treating medium is circulated through said compartment in one direction, and at a second position where said outlets are disposed at the other side of said housing to reverse the direction of circulation through said compartment, and means reacting automatically to the rotation of said shaft and impellers by said motor in said first and second directions to turn said housing to said first position and to said second position, repectively, whereby the direction of circulation of the gaseous treating medium through said compartment is reversed in response to reversal of the direction of rotation of said motor.

2. In an apparatus for treating food with a gaseous medium; the combination as in claim 1, wherein said motor includes a rotor connected to said driving shaft and a stator which is turnable about said axis of the shaft, and wherein said means reacting automatically to the rotation of the shaft and impellers by the motor to turn said blower housing includes rotatable coupling means between said housing and said turnable stator.

3. In an apparatus for treating food with a gaseous medium; the combination as in claim 1, wherein said outlets are of substantial angular extent and said means reacting automatically to the rotation of the shaft and impellers by the motor to turn said blower housing includes vanes projecting from said housing at the opposite margins of said angular extent of each of said outlets to be impinged against by the gaseous medium directed out of the related outlets by said impellers and thereby turn said housing in the direction of rotation of said shaft and impellers.

References Cited in the file of this patent
UNITED STATES PATENTS

| | | |
|---|---|---|
| 2,337,325 | Hach | Dec. 21, 1943 |
| 2,349,315 | Van Dorn | May 23, 1944 |
| 2,430,074 | O'Connor | Nov. 4, 1947 |